United States Patent [19]

Lew

[11] Patent Number: 4,910,994
[45] Date of Patent: Mar. 27, 1990

[54] IMPULSE SENSOR WITH CALIBRATION MEANS

[76] Inventor: Hyok S. Lew, 7890 Oak St., Arvada, Colo. 80005

[21] Appl. No.: 296,662

[22] Filed: Jan. 13, 1989

[51] Int. Cl.[4] .................................................. G01F 1/32
[52] U.S. Cl. ............................................. 73/1 B; 73/3
[58] Field of Search ..................... 73/1 B, 1 C, 3, 4 R, 73/4 V, 861.22, 861.24; 310/318

[56] References Cited

U.S. PATENT DOCUMENTS

| | | | |
|---|---|---|---|
| 4,022,061 | 5/1977 | Schendel | 73/3 |
| 4,776,222 | 10/1988 | Lew | 73/861.24 |
| 4,807,481 | 2/1989 | Lew | 73/861.24 |

FOREIGN PATENT DOCUMENTS

| | | | |
|---|---|---|---|
| 0023820 | 2/1982 | Japan | 73/3 |
| 1103102 | 7/1984 | U.S.S.R. | 73/1 B |

Primary Examiner—Robert R. Raevis

[57] ABSTRACT

An impulse sensor comprises a disc shaped Piezo electric element contained within a transducer container vessel with a thin wall, from which a force receiving member extends, wherein the Piezo electric element is pressed onto the thin wall. Each side of the disc shaped Piezo electric element includes at least a pair of electrodes disposed on two opposite sides of a reference plane perpendicular to the thin wall and including the central axis of the force receiving member. The electromotive forces from first two of the four electrodes respectively located on the two opposite sides of the reference plane, which may be on the same or opposite sides of the disc shaped Piezo electric element, are combined in such a way that noise associated with forces perpendicular to the thin wall is cancelled therebetween and signals representing forces perpendicular to the reference plane and exerted on the force receiving member are obtained. The other two of the four electrodes are connected to an electric power source that intermittently applies a pulse of electromotive force across the other two electrodes, which exerts a mechanical impulse on the Piezo electric element. The ratio of the magnitude of the impulse exerted on the force receiving member to the amplitude of electrical signal from the first two electrodes generated thereby is calibrated based on the ratio of the amplitude of the pulsed electromotive force applied across the other two electrodes to the amplitude of electrical signal from the first two electrodes generated by the mechanical impulse experienced by the Piezo electric element as a result of the electromotive force applied across the other two electrodes.

18 Claims, 2 Drawing Sheets

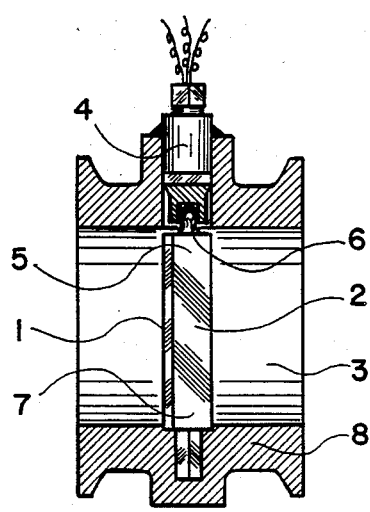
Fig. 1
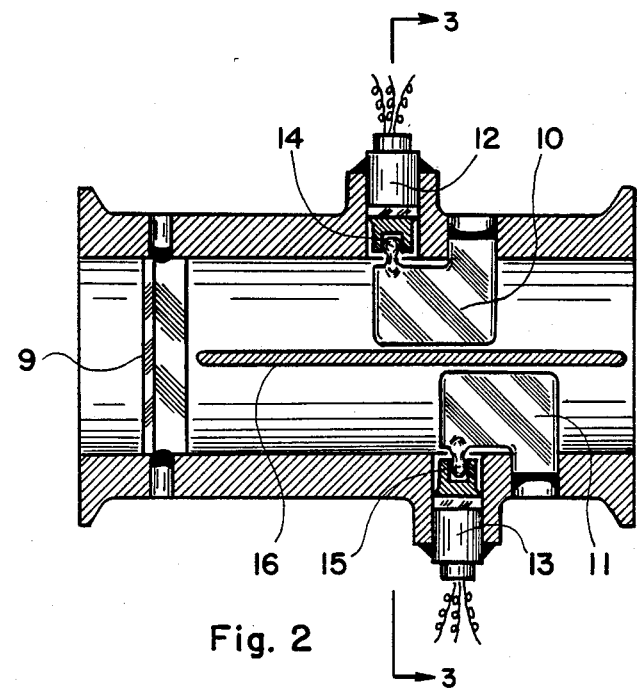
Fig. 2
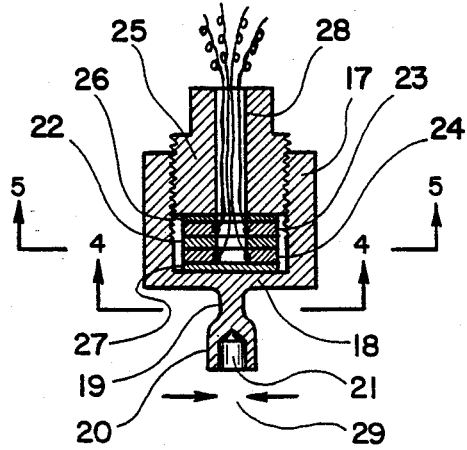
Fig. 3
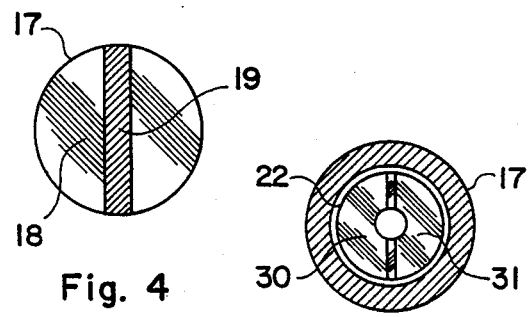
Fig. 4
Fig. 5
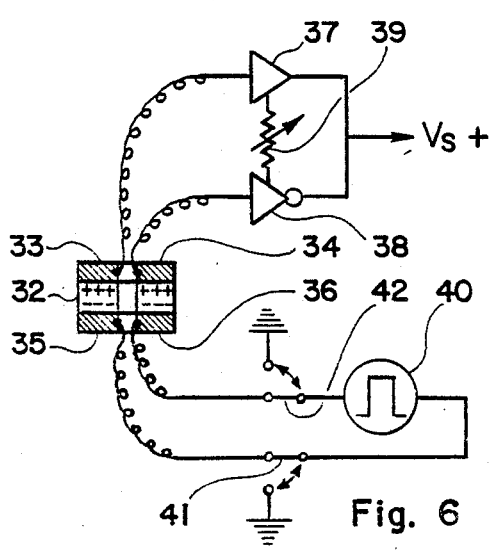
Fig. 6
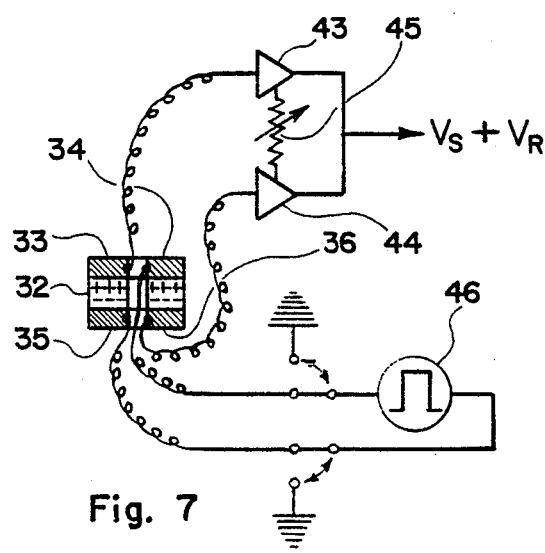
Fig. 7 pulse sensor of the present invention.

IMPULSE SENSOR WITH CALIBRATION MEANS

BACKGROUND OF THE INVENTION

Existing versions of the vortex shedding flowmeter measure fluid velocity only, wherein the fluid velocity is determined from the vortex shedding frequency. A new version of the vortex shedding flowmeter about to be introduced into the flowmeter market measures fluid velocity as well as mass flow rate of the fluid, wherein the mass flow rate is obtained as the ratio of the dynamic pressure determined from the amplitude of the fluid dynamic force associated with the vortex shedding to the fluid velocity determined from the vortex shedding frequency. The Piezo electric transducer commonly employed in the construction of vortex shedding flowmeter's experiences drift in performance due to aging, temperature, depolarization, etc., which drift introduces an error of significant magnitude in measuring the amplitude of the fluctuating fluid dynamic force generated by the vortex shedding, from which the mass flow rate of the fluid is determined. In order to eliminate the error in the measurement of mass flow rate, the drift in the performance of the Piezo electric transducer employed in the vortex shedding flowmeter measuring volume and mass flow rates must be detected and compensated.

BRIEF SUMMARY OF THE INVENTION

The primary object of the present invention is to provide a Piezo electric impulse sensor usable in conjunction with a vortex flowmeter that measures the frequency as well as the amplitude of the oscillating fluid dynamic force generated by the vortex shedding.

Another object is to provide a Piezo electric impulse sensor including a disc shaped Piezo electric element contained within a container vessel with a thin wall, from which a force receiving member extends, wherein each side of the disc shaped Piezo electric element includes at least a pair of electrodes respectively disposed on two opposite sides of a reference plane perpendicular to the thin wall and including the central axis of the force receiving member. The electromotive forces from the first two of the four electrodes included in the Piezo electric element, which two electrodes are respectively positioned on two opposite sides of the reference plane, are combined in such a way that the noise generated by the forces perpendicular to the thin wall is cancelled therebetween and signals representing the impulses perpendicular to the reference plane and exerted on the receiving member are obtained. An electric power source applies an electromotive force in pulse across the other two electrodes which electrical pulse exerts a mechanical impulse on the disc shaped Piezo electric element, which in turn generates an electromotive force from the first two electrodes. The ratio of the amplitude of the alternating fluid dynamic force to the amplitude of the electrical signals from the first two electrodes generated thereby is calibrated based on the ratio of the amplitude of the electrical pulse, applied across the other two electrodes to the amplitude of electrical signal from the first two electrodes generated by the mechanical impulse experienced by the Piezo electric element as a result of the electrical pulse.

A further object is to provide a Piezo electric impulse sensor including a disc shaped Piezo electric element contained within a container wall of the container vessel, from which a force receiving member extends. Each side of the disc shaped Piezo electric element includes a pair of electrodes respectively disposed on two opposite sides of a reference plane perpendicular to the thin wall and including the central axis of the force receiving member, wherein a third central electrode is disposed intermediate the pair of electrodes. The first two of the four electrodes set out from the reference plane, which two electrodes may be on the same or opposite sides of the disc shaped Piezo electric element and across the reference plane opposite to one another, provide electric signals which are combined to eliminate the noise generated by the forces perpendicular to the thin wall and yield electrical signals representing the alternating fluid dynamic force perpendicular to the reference plane and exerted on the force receiving member. The other two electrodes off set from the reference plane are grounded. An electrical power source applies an electromotive force in pulse across the two central electrodes respectively included on the two opposite sides of the Piezo electric element, which electrical pulse exerts a mechanical impulse on the Piezo electric element, which in turn generates an electromotive force from the first two outer electrodes. The ratio of the amplitude of the oscillating fluid dynamic force to the amplitude of electrical signals from the first two electrodes generated thereby is calibrated based on the ratio of the amplitude of the electrical pulse applied across the two central electrodes to the amplitude of the electrical signals from the first two electrodes generated by the mechanical impulse experienced by the Piezo electric element as a result of the electrical pulse.

These and other objects of the present invention will become clear as the description thereof progresses.

BRIEF DESCRIPTION OF THE FIGURES

The present invention may be described with a great clarity and specificity by referring to the following figures:

FIG. 1 illustrates a cross section of a vortex flowmeter comprising a vortex generator-sensor including a Piezo electric impulse sensor.

FIG. 2 illustrates a cross section of a vortex flowmeter comprising a vortex generating bluff body disposed across an upstream cross section of the flow passage and a pair of vortex sensing planar members respectively including a pair of Piezo electric impulse sensors, which planar members are disposed across two downstream cross sections of the flow passage, respectively.

FIG. 3 illustrates a cross section of the Piezo electric impulse sensor of the present invention.

FIG. 4 illustrates another cross section of the Piezo electric impulse sensor.

FIG. 5 illustrates a further cross section of the Piezo electric impulse sensor.

FIG. 6 illustrates a cross section of an embodiment of the disc shaped Piezo electric element and an electric circuit employed for signal refining and calibration.

FIG. 7 illustrates a cross section of another embodiment of the disc shaped Piezo electric element and an electric circuit employed for signal refining and calibration.

DESCRIPTION OF THE ILLUSTRATED EMBODIMENTS

Figure 8:
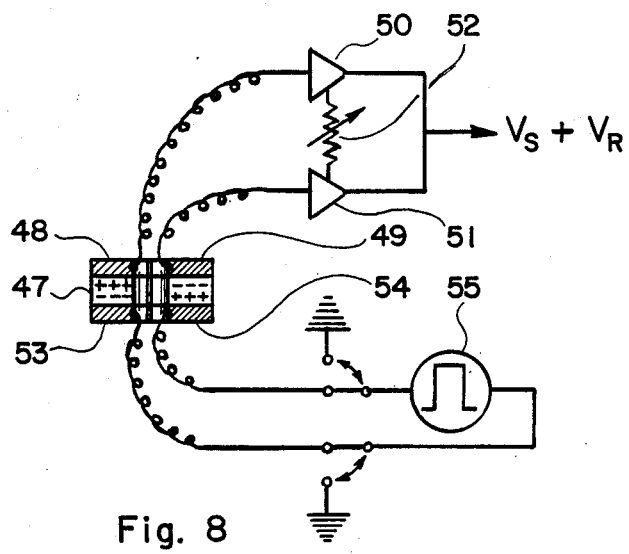
FIG. 8 illustrates a cross section of a further embodiment of the disc shaped Piezo electric element and an electric circuit employed for signal refining and calibration.

In FIG. 1 there is illustrated a cross section of a vortex flowmeter comprising a vortex generator-sensor 1, which includes a vortex generating bluff body 2 disposed across a cross section of the flow passage 3 and a Piezo electric impulse sensor 4 connected to one extremity 5 of the bluff body by a mechanical coupling 6 such as a ball and socket joint. The other extremity 7 of the bluff body 2 is fixedly secured to the wall 8 of the flow passage 3. The vortices shed from two sides of the bluff body 2 in an alternating pattern at a frequency proportional to the fluid velocity generate an alternating lift force on the bluff body that oscillates at the same frequency as the vortex shedding frequency. The Piezo electric impulse sensor 4 converts the alternating lift force to an alternating electromotive force. The fluid velocity is determined from the frequency of the alternating electromotive force generated by the Piezo electric impulse sensor 4, and the mass flow rate is determined from a combination of the frequency and amplitude of the alternating electromotive force generated by the vortex shedding. While the frequency of the alternating electromotive force is always the same as the frequency of the vortex shedding, the amplitude of the alternating electromotive force is only proportional to the amplitude of the alternating lift force generated by the vortex shedding, wherein the coefficient of the proportionality can change as the Piezo electric element in the impulse sensor 4 ages and depolarizes. In order to measure the mass flow rate accurately, the constant of proportionality relating the amplitude of the alternating electromotive force to the amplitude of the alternating lift force must be monitored and calibrated on an intermittent or real time basis.

In FIG. 2 there is illustrated a cross section of another vortex flowmeter comprising a vortex generating bluff body 9 disposed across an upstream cross section of the flow passage and fixedly secured to the wall of the flow passage and a pair of vortex sensing planar members 10 and 11 respectively disposed across two downstream cross sections of the flow passage, wherein the vortex sensing planar members 10 and 11 are respectively connected to a pair of Piezo electric impulse sensors 12 and 13 by the mechanical couplings 14 and 15. The flow passage may be divided into two equal halves respectively including the two vortex sensing planar members 10 and 11 by a divider plate 16. BY using only one of the two signals respectively generated by the two Piezo electric impulse sensors 12 and 13, the fluid velocity and the mass flow rate can be determined in the same method as that described in conjunction with the vortex flowmeter shown in FIG. 1. Therefore, one of the two vortex sensing planar members 10 and 11 can be omitted in the mode of operation wherein the vortex flowmeter determines the fluid velocity from the vortex shedding frequency, the mass flow rate from a combination of the vortex frequency and the amplitude of the alternating lift force generated by the vortex shedding, and the fluid density as the ratio of the mass flow rate to the volume flow rate. In the low end of the operating range of the vortex flowmeter, the relationship between the fluid velocity and the vortex shedding frequency is nonlinear and irregular and, consequently, the fluid velocity determined from the vortex shedding frequency is less than highly accurate in low fluid velocities. The employment of the dual vortex sensing planar members 10 and 11 respectively disposed across two different cross sections of the fluid passage provides another method for determining the fluid velocity. At low fluid velocities, the phase angle difference between the two electric signals respectively generated by the two Piezo electric transducers 12 and 13 is readily measurable, which phase angle difference is directly related to the time of travel of the fluid from the first vortex sensor 10 to the second vortex sensor 11. As a consequence, the fluid velocity can be determined accurately from the phase angle difference in a very low velocity range, while the fluid velocity in the low, medium and high velocity range is determined from the vortex shedding frequency. It should be mentioned again that, in determining the mass flow rate of the fluid flow from a combination of the frequency and the amplitude of the electrical signal generated by a Piezo electric impulse sensor, the constant of proportionality converting the amplitude of the alternating electric signal to the amplitude of the alternating lift force must be monitored and updated as the performance of the Piezo electric sensor drifts due to aging, temperature change, depolarization, etc.

In FIG. 3 there is illustrated a cross section of the Piezo electric impulse sensor employed in the embodiment shown in FIG. 1 or 2, which cross section is take along plane 3—3 as shown in FIG. 2. The transducer container vessel 17 has a cylindrical cavity with a relatively thin end wall 18 that includes a reinforcing rib 19 extending thereacross, wherein a force receiving member 20 with a mechanical coupling means 21 such as a socket or thread joint extends from the reinforcing rib 19. A disc shaped Piezo electric element 22 sandwiched between two layers of electrodes 23 and 24 is disposed within the container vessel 17 and pressed against the thin wall 18 as the plug 25 threaded engaging the open end of the cavity compresses the combination of the Piezo electric element 22 and the electrodes 23 and 24 against the thin wall 18. When the container vessel 17 and the plug 25 are made of an electrically conducting material, the stack of the Piezo electric element 22 and the electrodes 23 and 24 are electrically insulated from the container vessel 17 and the plug 18 by insulator discs 26 and 27. The conductor wires extending from the electrodes are routed through an axial hole 28 included in the plug 25. It is important that there is a spacing between the cylindrical surface of the stacked assembly including the Piezo electric element 22 and electrodes 23 and 24 and the cylindrical wall of the cavity. The lateral force 29 generally perpendicular to a reference plane including the reinforcing rib 19 and exerted on the force receiving member 20 alternative compresses and decompresses the two halves of the disc shaped Piezo electric element 22 disposed across the reference plane perpendicular to the thin wall 18 and, including the reinforcing rib 19 and the central axis of the force receiving member 20.

In FIG. 4 there is illustrated another cross section of the Piezo electric impulse sensor shown in FIG. 3, which cross section taken along plane 4—4 as shown in FIG. 3 shows the arrangement of the reinforcing rib 19 built on the external surface of the thin wall 18.

In FIG. 5 there is illustrated a further cross section of the Piezo electric impulse sensor shown in FIG. 3, which cross section is taken along plane 5—5 as shown in FIG. 3. The Piezo electric element 22 is superficially or physically divided into the two halves 30 and 31, which two halves respectively disposed on the two opposite sides of the reference plane including the reinforcing rib 19 are respectively in contact with a plurality of electrodes.

In FIG. 6 there is illustrated a cross section of an embodiment of the disc shaped Piezo electric element 32 usable in place of the element 22 included in the embodiment shown in FIG. 3, which cross section is taken along a plane perpendicular to the reference plane, and an electronic circuit employed for refining and calibrating the signals generated thereby. The Piezo electric element 32 has the shape of a circular disc, that is a uniformly polarized single disc sandwiched between two circular disc electrodes, wherein the two circular disc electrodes are respectively split into two halves 33 and 34, and 35 and 36 along the reference plane including the reinforcing rib. The two separated halves 33 and 34 of the electrode included on the one side of the Piezo electric disc 32 are respectively connected to a noninverting amplifier 37 and an inverting amplifier 38, which combination of the amplifiers includes a signal balancing means 39 therebetween. The two separated halves 35 and 36 of the electrode included on the other side of the Piezo electric disc 32 are connected to an electric power source 40 supplying an electromotive force in a single or multiple pulses, wherein a pair of switches 41 and 42 may be included, which isolate the electrodes 35 and 36 from the electrical power source 40 and ground them. The mechanical impulse perpendicular to the reference plane and exerted onto the force receiving member 20 alternately compresses and decompresses the two halves of the Piezo electric element 32, which action generates two electromotive forces of opposite signs supplied through the two separated halves 33 and 34 of the first electrode to the two amplifiers 37 and 38. The outputs from the two amplifiers are combined in such a way as to cancel the noises generated by the mechanical impulses perpendicular to the thin wall 18 and a refined signal $V_s$ representing the mechanical impulse perpendicular to the reference plane is obtained. The noise cancellation between the two outputs from the amplifiers 37 and 38 is accomplished by the signal balancing means 39. The electric power source 40 applies an electromotive force in a single or multiple pulses across the two separated halves 35 and 36 of the second electrode, which induces a mechanical impulse of opposite signs on the two halves of the Piezo electric element 32 and generates the combined output signal $V_R$, that is generated in part by the capacitive reaction between the two electrodes on the two opposite sides of the Piezo electric element 32 and in part by the mechanical impulse of Piezo electric reaction to the electric pulse supplied by the electric power source. The amplitude ratio of the Piezo electric portion of $V_R$ to the electric pulse supplied by the electric power source 40 provides a basis for calibrating the conversation relationship that determines the amplitude of the alternating lift force generated by the vortex shedding from the amplitude of the alternating signal $V_S$ generated by the vortex shedding. The actual mathematical relationship between the Piezo electric portion of $V_R$, electric pulse supplied by the electrical power source 40, the vortex signal $V_S$ and the alternating lift force must be determined empirically and stored in a data processor that determines the amplitude of the alternating lift force generated by the vortex shedding from the amplitude of the electrical signal $V_S$ generated by the vortex shedding independent of the drift in the performance of the Piezo electric element 32 included in the impulse sensor shown in FIG. 3. The calibration operation initiated by the electrical pulse supplied by the electrical power source 40 can be operated on an intermittent or continuous basis. It is desired to use a high intensity electrical pulse from the electrical power source 40 so that the amplitude of $V_R$ is significantly greater than the amplitude of $V_S$ whereby the amplitude of $V_R$ is readily measured, or a frequency significantly higher than the maximum vortex shedding frequency for the calibration alternating electrical signal supplied by the electrical power source whereby $V_R$ can be separated from $V_S$ by a band width filter. When the calibration operation is turned off, the switches 41 and 42 should ground the electrodes 35 and 36.

In FIG. 7 there is illustrated a cross section of the same embodiment of the Piezo electric element 32 as that shown in FIG. 6, which employs a modified electric circuit for signal refining and calibration. In this embodiment, the electrodes 33 and 36 are respectively connected to two noninverting amplifiers 43 and 44 equipped with the signal balancing means 45, while the electrodes 34 and 35 are connected to the calibration power source 46 via the grounding switches. This embodiment operates on the same principles as those described in conjunction with FIG. 6.

In FIG. 8 there is illustrated another embodiment of the disc shaped Piezo electric element 47 having two oppositely polarized halves. The first two electrodes 48 and 49 of the two halves of the Piezo electric element 47 disposed on one side thereof are respectively connected to two noninverting amplifiers 50 and 51 equipped with a signal balancing means 52, while the second two electrodes 53 and 54 of the two halves of the Piezo electric element 47 disposed on the other side thereof are connected to the calibration power source 55 via the grounding switches. This embodiment operates on the same principles as those described in conjunction with FIG. 6. It should be mentioned that the noninverting amplifiers included in the embodiments shown in FIGS. 7 and 8 may be replaced with inverting amplifiers.

Figure 9:
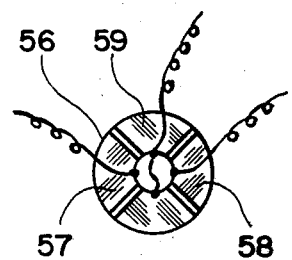
FIG. 9 illustrates a plan view of an embodiment of the disc shaped Piezo electric element with three electrodes on each side thereof.

In FIG. 9 there is illustrated a plan view of a further embodiment of the disc shaped Piezo electric element usable in place of the combination of the elements 22, 23 and 24 included in the embodiment shown in FIG. 3. Each side of the disc shaped Piezo electric element 56 has two outer electrodes 57 and 58 disposed on two opposite sides of the reference plane and a central electrode 59 straddling the reference plane.

Figure 10:
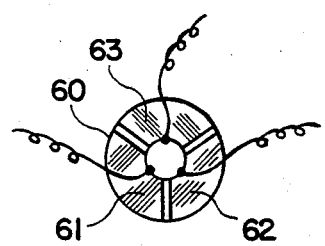
FIG. 10 illustrates a plan view of another embodiment of the disc shaped Piezo electric element with three electrodes on each side thereof.

In FIG. 10 there is illustrated a plan view of yet another embodiment of the disc shaped Piezo electric element 60, wherein each side thereof comprises two outer electrodes 61 and 62 and a central electrode 63 intermediate the two outer electrodes 61 and 62 and straddling the reference plane.

Figure 11:
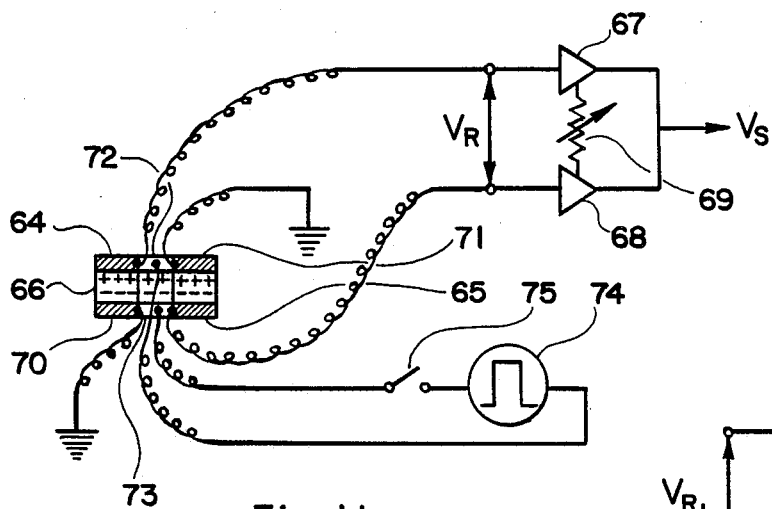
FIG. 11 illustrates an embodiment of the electric circuit usable in conjunction with a disc shaped Piezo electric element with three electrodes on each side thereof, that is employed for signal refining and calibration.

In FIG. 11 there is illustrated a cross-section of a disc shaped Piezo electric element with each side including three electrodes as shown in FIG. 9 or 10, and an electric circuit employed for refining and calibrating the electric signal generated thereby. The two outer electrodes 64 and 65 respectively disposed on the two opposite sides of the disc shaped Piezo electric element 66 across the reference plane are respectively connected to two amplifiers 67 and 68 equipped with a signal balancing means 69, while the two outer electrodes 70 and 71 are grounded. The central electrodes 72 and 73 are connected to the calibration electric power source 74. The alternating lift force generated by the vortex shedding alternately compresses and decompresses the two halves of the Piezo electric element 66 and generates alternating electromotive forces of the same sign from the two electrodes 64 and 65, which are supplied to the two amplifiers 67 and 68, wherein the outputs therefrom are combined in such a way that the noise generated by the mechanical impulse perpendicular to the plane of the Piezo electric element 66 is cancelled and a refined electrical signal $V_S$ representing the alternating lift force generated by the vortex shedding is obtained. The signal balancing means 69 is used to balance out the noises between the two amplifiers 67 and 68. The calibration electric pulse applied across the two central electrodes 72 and 73 generates electromotive forces of opposite signs from the two electrodes 64 and 65, which produces differences in the electromotive force $V_R$ therebetween. As mentioned in conjunction with the operating principles of the embodiment shown in FIG. 6, the amplitude ratio of the Piezo electric portion of the $V_R$ to the calibration electric pulse supplied by the electric source 74 provides a basis for calibrating the conversion relationship that determines the amplitude of the alternating lift force generated by the vortex shedding from the amplitude of the electrical signal $V_S$ generated by the vortex shedding. The greatest advantage provided by this embodiment is the exclusive nature of $V_R$ and $V_S$, wherein $V_R$ and $V_S$ can be measured independently and separately as the two signals do not mix or interfere with each other. As a consequence, the calibration electric pulse supplied by the electric source 74 can be operated at any amplitude and any frequency. When the calibration mode is not in operation, the switch 75 is kept open.

Figure 12:
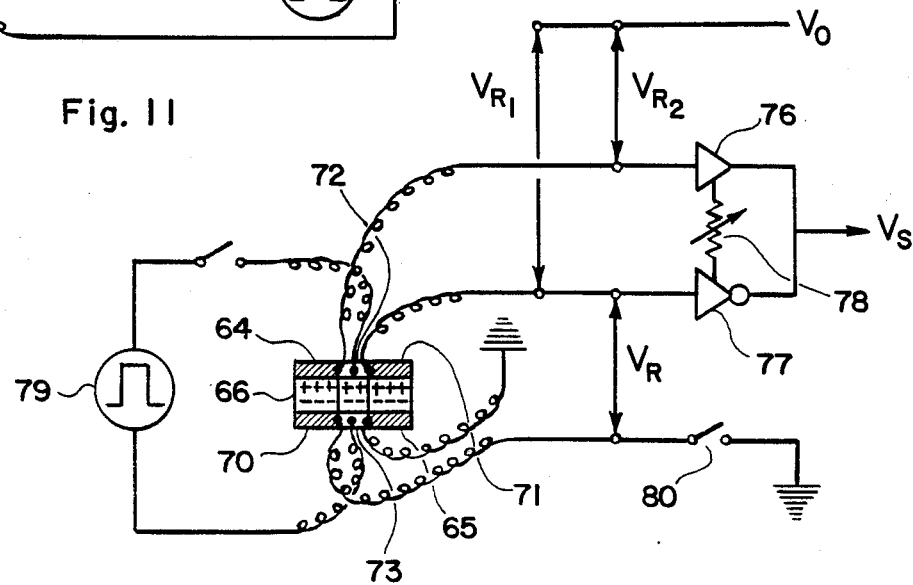
FIG. 12 illustrates another embodiment of the electric circuit usable in conjunction with a disc shaped Piezo electric element with three electrodes on each side thereof, that is employed for signal refining and calibration.

In FIG. 12 there is illustrated the same embodiment of the Piezo electric element as that included in FIG. 11, and a modified electronic circuit employed for signal refining and calibration. The electrodes 64 and 71 are respectively connected to a noninverting amplifier 76 and an inverting amplifier 77, which combination includes a signal balancing means 78. The electrodes 65 and 70 are grounded. The central electrodes 72 and 73 are connected to the calibration electric power source 79. The electric pulse applied across the central electrodes 72 and 73 generates calibration electromotive force $V_R$ across the two electrodes 70 and 71, and $V_{R1}$ and $V_{R2}$ respectively from the two electrodes 71 and 64 wherein $V_{R1}$ and $V_{R2}$ are measured relative to a constant reference potential $V_o$. In obtaining the calibration basis as explained in conjunction with FIG. 11, one may use the Piezo electric portion of $V_R$, $(V_{R1}+V_{R2})/2$, $V_{R1}$ or $V_{R2}$ defined in conjunction with FIG. 12 in place of the $V_R$ defined in conjunction with FIG. 11. In measuring $V_R$ in the embodiment shown in FIG. 12, the switch 80 connecting the electrode 70 to the grounding wire may be opened.

While the principles of the present invention have now been made clear by illustrative embodiments, there will be immediately obvious to those skilled in the art many modifications in the structures, arrangements, proportions, elements and materials, which are particularly adapted to the specific working environments and operating conditions in the practice of the invention without departing from those principles. It is not desired to limit the inventions to the particular illustrative embodiments shown and described and, accordingly, all suitable modifications and equivalents may be resorted to falling within the scope of the inventions as defined by the claims which follow.

The embodiments of the invention, in which an exclusive property and privilege is claimed, are defined as follows:

1. An impulse sensor comprising in combination:
   (a) a container vessel including a cavity with a deflective wall on one side and a force receiving member extending from said deflective wall;
   (b) a planar Piezo electric element disposed within said cavity parallel to said deflective wall and pressed against said deflective wall wherein the planar Piezo electric element extends across a reference plane generally perpendicular to the deflective wall and generally including the central axis of the force receiving member, each side of the planar Piezo electric element including a pair of electrodes respectively disposed on two opposite sides of said reference plane;
   (c) an electric circuit including means for combining two electrical signals respectively originating from first of the electrodes disposed on one side of said reference plane and second of the electrodes disposed on the other side of said reference plane opposite to said one side, and means for cancelling out noises between said two electrical signals; and
   (d) an electrical power source supplying a pulsed electromotive force across a third and fourth of the electrodes;

wherein a relationship between the amplitude of said pulsed electromotive force and the amplitude of an electrical signal generated by said pulsed electromotive force and conditioned through said electric circuit is used as a calibration standard in determining the amplitude of an impulse laterally exerted on the force receiving member from the amplitude of an electrical signal generated by said impulse and conditioned through said electrical circuit.

2. The combination as set forth in claim 1 wherein said deflective wall includes a reinforcing rib disposed diametrically thereacross on said reference plane.

3. The combination as set forth in claim 1 wherein said first and second of the electrodes are disposed on one side of the planar Piezo electric element.

4. The combination as set forth in claim 3 wherein said combination includes means for grounding said third and fourth of the electrodes, when said electrical power source is not supplying the pulsed electromotive force.

5. The combination as set forth in claim 4 wherein said deflective wall includes a reinforcing rib disposed diametrically thereacross on said reference plane.

6. The combination as set forth in claim 1 wherein said first and second of the electrodes are respectively disposed on two opposite sides of the planar Piezo electric element.

7. The combination as set forth in claim 6 wherein said combination includes means for grounding said third and fourth of the electrodes, when said electrical power source is not supplying the pulsed electromotive force.

8. The combination as set forth in claim 7 wherein said deflective wall includes a reinforcing rib disposed diametrically thereacross on said reference plane.

9. An impulse sensor comprising in combination:
(a) a container vessel including a cavity with a deflective wall on one side and a force receiving member extending from said deflective wall;
(b) a planar Piezo electric element disposed within said cavity parallel to said deflective wall and pressed against said deflective wall wherein the planar Piezo electric element extends across a reference plane generally perpendicular to the deflective wall and generally including the central axis of the force receiving member, each side of the planar Piezo electric element including a middle electrode straddling said reference plane, and a pair of side electrodes respectively disposed on two opposite sides of the middle electrode;
(c) electronic signal conditioning means for combining a first electrical signal from one side electrode disposed on one side of the reference plane and a second electrical signal from another side electrode disposed on the other side of the reference plane opposite to said one side, wherein electrical signal generated by a mechanical impulse exerted on the planar Piezo electric element perpendicular thereto are cancelled between said first and second electrical signals and electrical signal generated by a mechanical impulse exerted on the force receiving member perpendicular to the reference plane is obtained;
(d) means for imposing a pulsed input electrical potential difference of known amplitude across the two middle electrodes respectively disposed on two opposite sides of the planar Piezo electric element; and
(e) means for determining a ratio of the amplitude of pulsed output electrical potential from at least one of said side electrodes generated by said pulsed input electrical potential difference to the amplitude of said pulsed input electrical potential difference as a calibration standard determining for subsequently the amplitude of a mechanical impulse exerted on the force receiving member from amplitude of output electrical signal from said electronic signal conditioning means.

10. The combination as set forth in claim 9 wherein said deflective wall includes a reinforcing rib disposed diametrically thereacross on said reference plane.

11. The combination as set forth in claim 9 wherein said one side electrode supplying said first electrical signal and said another side electrode supplying said second electrical signal are respectively disposed on two opposite sides of the planar Piezo electric element.

12. The combination as set forth in claim 11 wherein ratio of amplitude of electrical potential difference between said one side electrode and said another side electrode that is generated by said pulsed input electrical potential difference to amplitude of said pulsed input electrical potential difference is used as said calibration standard.

13. The combination as set forth in claim 12 wherein side electrodes other than said one side electrode supplying the first electrical signal and said another side electrode supplying the second electrical signal are grounded.

14. The combination as set forth in claim 13 wherein said deflective wall includes a reinforcing rib disposed diametrically thereacross on said reference plane.

15. The combination as set forth in claim 9 wherein said one side electrode supplying said first electrical signal and said another side electrode supplying said second electrical signal are disposed on the same side of the planar Piezo electric element.

16. The combination as set forth in claim 15 wherein ratio of average value of amplitude of pulsed output electrical potentials supplied by said one and said another electrodes that is generated by said pulsed input electrical potential difference to amplitude of said pulsed input electrical potential difference is used as said calibration standard.

17. The combination as set forth in claim 16 wherein said electrodes other than said one side electrode supplying the first electrical signal and said another side electrode supplying the second electrical signal are grounded.

18. The combination as set forth in claim 17 wherein said deflective wall includes a reinforcing rib disposed diametrically thereacross on said reference plane.

* * * * *